June 15, 1926.

C. C. SPRINKLE

HUMIDIFIER

Filed Oct. 1, 1923

1,588,551

Witnesses:

Inventor:
C. C. Sprinkle
By H. J. Sanders
Atty.

Patented June 15, 1926.

1,588,551

UNITED STATES PATENT OFFICE.

CLARENCE C. SPRINKLE, OF MARION, INDIANA, ASSIGNOR OF ONE-THIRD TO (MISS) CHRISTIAN E. SMITH, OF MARION, INDIANA.

HUMIDIFIER.

Application filed October 1, 1923. Serial No. 666,023.

This invention relates to humidifiers and more particularly to that class of humidifiers adapted primarily for use with hot air furnaces. One of the objects of the invention is to provide a vaporizing tank located within the jacket of the hot air furnace to moisten the air heated by the furnace preparatory to its being distributed over the areas to be heated, said tank being provided with novel and economically driven vapor agitating means and with automatically controlled tank filling means.

A still further object is to provide a device of this class that is very simple in construction, of few parts, efficient in use, cheap to manufacture and install, and that is operated at the minimum expense.

With the foregoing and other objects in view the invention consists in the combination and arrangement of parts to be hereinafter fully described, pointed out in the appended claims and illustrated in the accompanying drawing which forms a part of this application and in which—

Like reference characters denote corresponding parts in both views.

Figure 1:
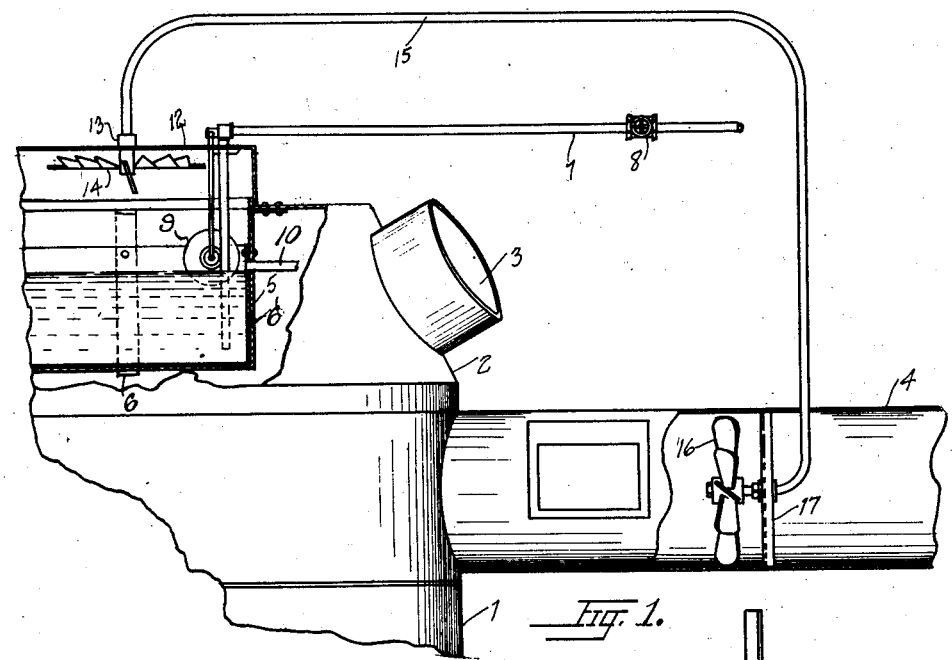
Fig. 1 is a fragmentary view of a hot air furnace provided with the improved humidifier.
Figure 2:
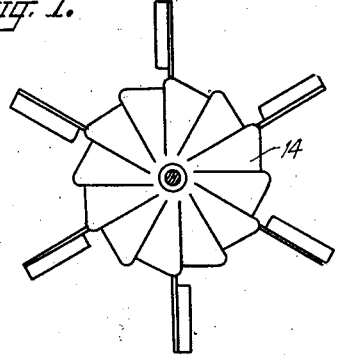
Fig. 2 is a plan view of the form of vapor agitator employed.

The reference numeral 1 denotes the furnace shell having the usual heated air compartment 2, from which the hot air pipes 3 radiate, and the smoke pipe 4. Within the compartment 2 I provide the tank 5 carried by metal bands or supports 6 secured to the furnace. In old furnaces an opening may be cut in the top to snugly receive the tank while in furnaces built with the installation of this tank in view a space will be provided to accommodate the same readily. Water is supplied to the tank by means of the inlet pipe 7, having the usual hand valve 8, and provided with the float valve 9 of well known construction so that a predetermined quantity of water is kept in the tank at all times. The tank is provided also with an overflow or drain pipe 10.

Above the tank and secured to the furnace is a cover 12 located above the top of the tank, said cover carrying the hub 13 of the rotary fan 14. The fan agitates the vapor arising from the water in the tank and drives it out through the pipes 3.

The fan shaft comprises the flexible tube 15 connected to the rotary fan 16 operably supported within the smoke pipe 4 by the element 17. The smoke and gases passing rapidly through the smoke pipe serve to drive the fan 16 which supplies driving power for the fan 14. Heat from the furnace will evaporate the water in the tank and this vapor is thoroughly agitated by the fan 14 and mixed with the heated air in the furnace compartment 2 as the same passes out through the air pipes 3.

What is claimed is:—

1. In a humidifier for hot air furnaces, a vaporizing tank arranged in the furnace air chamber, water supply means for said tank, a rotary vapor agitator for said tank, a rotary fan in the smoke pipe of the furnace, and power transmission means connecting said fan and vapor agitator.

2. In a humidifier for hot air furnaces, a vaporizing tank arranged in the furnace air chamber, water supply and drain means for said tank, a cover above said tank, a rotary vapor agitator arranged above said tank with its shaft operatively supported in said cover, a rotary fan arranged in the smoke pipe of the furnace, and a flexible tube extending from said cover to and into the smoke pipe and operatively connecting said fan and vapor agitator.

In testimony that I claim the foregoing as my own I have hereto affixed my signature.

CLARENCE C. SPRINKLE.